(12) United States Patent
Li (10) Patent No.: US 11,029,549 B2
(45) Date of Patent: Jun. 8, 2021

(54) LIQUID CRYSTAL WRITING DEVICE

(71) Applicant: WICUE, INC., Cupertino, CA (US)

(72) Inventor: Fenghua Li, San Jose, CA (US)

(73) Assignee: WICUE, INC., Cupertino, CA (US)

( * ) Notice: Subject to any disclaimer, the term of this patent is extended or adjusted under 35 U.S.C. 154(b) by 0 days.

(21) Appl. No.: 15/569,741

(22) PCT Filed: Apr. 28, 2016

(86) PCT No.: PCT/US2016/029882
§ 371 (c)(1),
(2) Date: Oct. 26, 2017

(87) PCT Pub. No.: WO2016/176508
PCT Pub. Date: Nov. 3, 2016

(65) Prior Publication Data
US 2018/0143475 A1    May 24, 2018

Related U.S. Application Data

(60) Provisional application No. 62/154,054, filed on Apr. 28, 2015.

(51) Int. Cl.
*G06F 3/0354* (2013.01)
*G02F 1/1333* (2006.01)
(Continued)

(52) U.S. Cl.
CPC ...... *G02F 1/13338* (2013.01); *G02F 1/13718* (2013.01); *G06F 3/017* (2013.01); *G06F 3/0416* (2013.01)

(58) Field of Classification Search
None
See application file for complete search history.

(56) References Cited

U.S. PATENT DOCUMENTS

| 6,982,432 B2 | 1/2006 | Umemoto et al. |
| 2003/0071958 A1 | 4/2003 | Wu et al. |

(Continued)

FOREIGN PATENT DOCUMENTS

| CN | 101311800 | 11/2008 |
| CN | 102346536 | 2/2012 |

(Continued)

OTHER PUBLICATIONS

International Search Report and Written Opinion (ISA/KR) for International Application No. PCT/US2016/029882, dated Aug. 19, 2016.

(Continued)

*Primary Examiner* — Carl Adams
(74) *Attorney, Agent, or Firm* — Weaver Austin Villeneuve & Sampson LLP (57) ABSTRACT

Embodiments are disclosed for selectively and partially erasing images from a liquid crystal writing device. A liquid crystal writing device according to some embodiments includes a transparent top layer, a liquid crystal layer including a plurality of liquid crystal cells beneath the transparent top layer, a matrix of electrodes, and a control circuitry. The liquid crystal layer displays an image by switching cells to a reflective state. The writing device detects a mechanical pressure applied on a pressed area, the mechanical pressure indicating a command to erase at least a portion of the image from the pressed area. The control circuitry instructs one or more electrodes from the matrix to apply an erase voltage signal to a portion of the liquid crystal cells that correspond to the pressed area, wherein the erase voltage signal switches the portion of the liquid crystal cells to the scattering state.

15 Claims, 9 Drawing Sheets

(51) Int. Cl.
*G02F 1/137* (2006.01)
*G06F 3/01* (2006.01)
*G06F 3/041* (2006.01)

(56) References Cited

U.S. PATENT DOCUMENTS

| | | |
|---|---|---|
| 2004/0246431 A1 | 12/2004 | Asada |
| 2005/0083564 A1 | 4/2005 | Mallya et al. |
| 2006/0290691 A1* | 12/2006 | Sato .................. G06F 3/147 345/211 |
| 2008/0266278 A1* | 10/2008 | Lee .................... G02F 1/13338 345/208 |
| 2009/0096942 A1* | 4/2009 | Schneider ............... B43L 1/00 349/12 |
| 2009/0290078 A1 | 11/2009 | Yang et al. |
| 2011/0035685 A1* | 2/2011 | Johanson ........... G06F 3/04842 715/753 |
| 2012/0268420 A1 | 10/2012 | Marhefka et al. |
| 2013/0100074 A1 | 4/2013 | Chang et al. |
| 2014/0111470 A1* | 4/2014 | Wu ..................... G06F 3/0445 345/174 |
| 2014/0300606 A1* | 10/2014 | Nakada ............. G06F 3/04883 345/441 |
| 2014/0340589 A1 | 11/2014 | Montbach et al. |
| 2015/0124178 A1 | 5/2015 | Khan et al. |
| 2015/0193028 A1* | 7/2015 | Narita .................. G06F 3/0488 345/173 |

FOREIGN PATENT DOCUMENTS

| | | |
|---|---|---|
| CN | 103092401 | 5/2013 |
| CN | 107820582 | 3/2018 |
| JP | 2001-290135 A | 10/2001 |
| WO | WO 2016176508 | 11/2016 |

OTHER PUBLICATIONS

PCT/US2016/029882, "International Preliminary Report on Patentability", dated Nov. 9, 2017, 14 pages.
PCT/US2017/038854, "International Preliminary Report on Patentability", dated Jan. 3, 2019, 11 pages.
PCT/US2017/038854, "International Search Report and Written Opinion", dated Sep. 27, 2017, 12 pages.
CN Office Action dated Jun. 2, 2020, in Application Serial No. 201680032987.2.
CN Office Action dated Mar. 24, 2021, in Application Serial No. 201680032987.2.

* cited by examiner

LIQUID CRYSTAL WRITING DEVICE

CROSS REFERENCE TO RELATED APPLICATIONS

This application is a national stage entry under 35 U.S.C. § 371 of International Application No. PCT/US2016/029882, filed Apr. 28, 2016, which claims priority to U.S. Provisional Application No. 62/154,054 entitled "Liquid Crystal Writing Device With Selectively Erase Function," filed Apr. 28, 2015, the content of each of which is hereby incorporated by reference in its entirety.

BACKGROUND

Bistable liquid crystal displays are utilized as display devices due to low power consumption. After the display content is shown on the display, a bistable liquid crystal display does not need voltage to hold the display content until it is switched to the new display content. For example, U.S. Pat. No. 6,104,448 discloses a cholesteric liquid crystal mixing with polymer has bistability including both a light scattering focal conic texture and a light reflective planar texture, in which the chiral dopant has a pitch length reflecting light in the visible spectrum and the polymer network is distributed uniformly holding the liquid crystal domains.

DETAILED DESCRIPTION

The disclosed embodiments introduce a liquid crystal (LC) writing apparatus with a selective erase function. The LC writing apparatus can obtain operating commands from user and determine if it is partial or full erase command. If the command is a partial erase command, the LC writing apparatus then applies pre-determined erasing voltage onto the target erase area between first electrode and second electrode that correspond to the target erase area. Thus, the target erase area will be applied with corresponding electric field to erase the displayed marks that have been written on the target erase area. In some embodiments, the partial erase effect on writing device can be integrated with capacitive touch components inside the liquid crystal cell.

In some embodiments, the liquid crystal writing device can be integrated with recording function. The liquid crystal writing device includes a first conductive layer, an active liquid crystal layer (with or without polymer), and a second conductive layer that has a dark background. The device can further include capacitive touch sensor that is located at each of the conductive layer sandwiching the liquid crystal layer. A user of the device can write on the flexible pressure-sensitive liquid crystal writing device by applying mechanical stress on the surface of the writing device. The device can record the writing by tracing the written information into digital images using the capacitive touch sensor and saving the digital images into memory.

In some embodiments, the device can also have display functions so that the previous writings and drawings or any graphics and text can be displayed again on the writing surface for reading and editing. The graphics content retrieved from memory or external devices can be displayed on the writing device directly. In some embodiments, remotely utilizing two or more sets of these liquid crystal writing devices, users in different locations in a conference can remotely write and edit together on the same written content displayed on separate writing devices.

Figure 1:
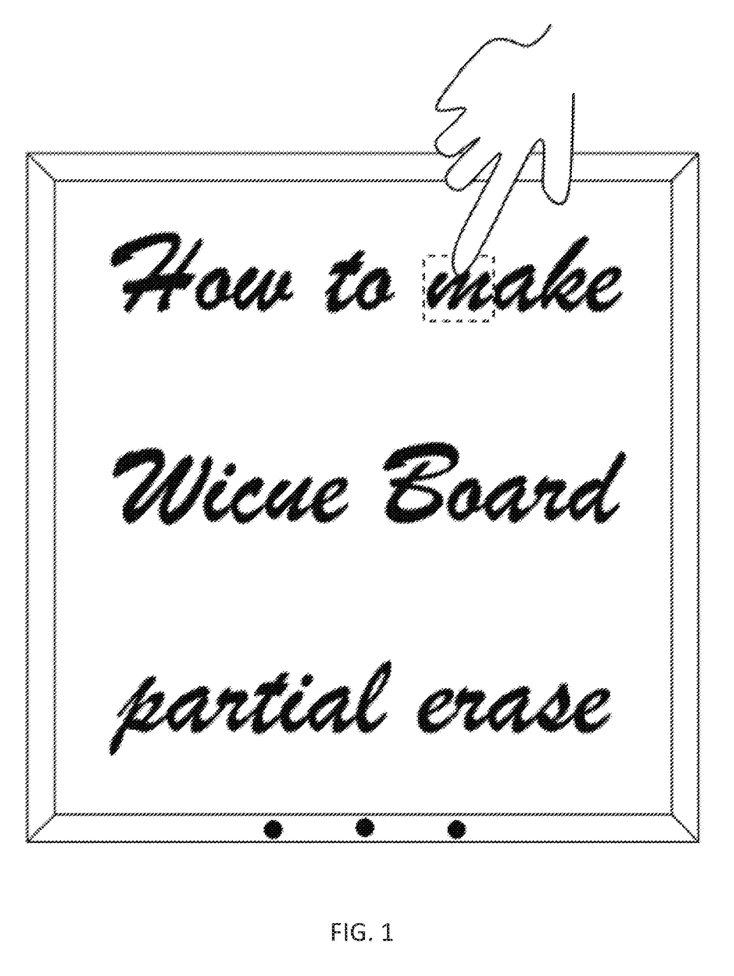
FIG. 1 is an illustration of a liquid crystal (LC) writing device with a partial erase function.

FIG. 1 is an illustration of a liquid crystal writing device with a partial erase function. The liquid crystal writing device can erase partially or selectively any content displayed on the device. For example, as shown in FIG. 1, a user wrote "How to make Wicue Board partial erase" on the writing device. The writing device displays the words accordingly. Then the user may need to change the writing or correct any error, e.g., changing a particular letter. The user can use a finger to erase a target portion of the writing or drawing (indicated by the dashed lines in FIG. 1), without other portions of the writing or drawing being affected.

In some embodiments, the liquid crystal writing device can be a high-brightness liquid crystal writing tablet with a large size up to 1.2 meter by 4 meter. The writing device can be manufactured using a reliable, fast and effective roll-to-roll method at low cost and at large width with a good uniformity. The writing device offers a perfect replacement of blackboard in classroom and whiteboard in meeting room, which has clear advantages over conventional LC writing device technologies that have relatively low brightness due to the existence of polymer. Usually the polymer will make the reflectance of cholesteric LC weaker because the surface anchoring of polymer domain aligns cholesteric liquid crystal helix into different orientation. The liquid crystal writing device as illustrated in FIG. 1 can avoid the effect from polymer and still can be manufactured using roll-to-roll production method. The writing device can provide a writing space having a large size and is an eco-friendly writing tablet for teachers to avoid the chalk dust and eliminate the usage of costly dry erase markers for the whiteboards.

In some embodiments, a black ink can be coated onto the bottom substrate or the substrate material of the device can be black flexible polyethylene terephthalate (PET) in order to create a high contrast writing trace appearance. An application of a mechanical stress from any hard tip to the cholesteric liquid crystal layer can change the liquid crystal cells from a light-scattering focal conic (FC) texture to a light-reflective planar (P) texture. A short electrical pulse with enough voltage (also referred to as erase voltage level) to the liquid crystal layers sandwiched between two conductive layers returns the reflective planar texture back into initial light scattering focal conic texture. The erase voltage level can depend on various factors of the liquid crystal cells including, e.g., thickness of the liquid crystal cells. In some embodiments, the erase voltage level can be from 5 volts to 40 volts. In order to switch from P-state to FC-state, the erase voltage pulse reaches a high voltage level (e.g., 40 volts) first. Then the voltage level gradually decreases to zero within a time period. Such a time period can last for, e.g., tens or hundreds of milliseconds.

In some embodiments, the liquid crystal writing surface can be integrated with recording function, so that the user can save the writing into digital images in various formats, such as PDF, JPG, etc. The liquid crystal writing surface can be also integrated with display function, so that the user can read the previously written information or other graphics/text from their mobile device or internal memory on the writing device. The writing device displays the information so that the user can edit or discuss based on the displayed content. In some other embodiments, remotely utilizing two or more sets of these liquid crystal writing devices, users in different locations in a conference can remotely write and edit together on the same written content displayed on separate writing devices.

Figure 2A:
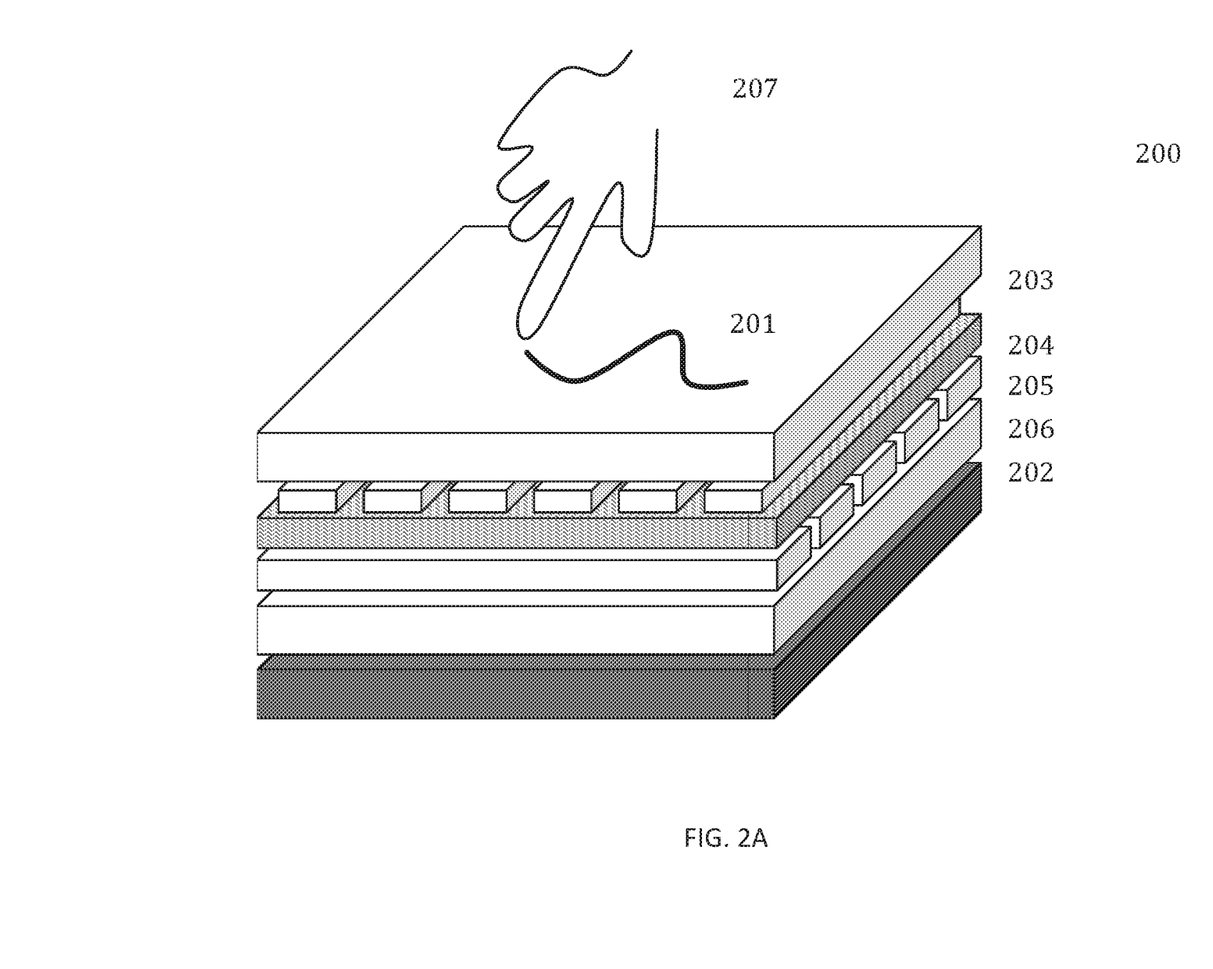
FIG. 2A is an illustration of a liquid crystal writing device having multiple layers.

FIG. 2A is an illustration of a liquid crystal writing device having multiple layers. The bistable liquid crystal writing device can have, e.g., a partial erase function, a save function and a display function. Pressure-generated writing image is displayed on the writing device because mechanical stress can make the cholesteric liquid crystal molecules change orientation from focal-conic (FC) scattering state (dark) into planar (P) color reflective state (bright). The reflective writing color can be from the ambient light. A strong ambient light can enhance the brightness of the written content on the writing board. In some embodiments, the reflective color is green to make the LC blackboard appear bright to user. Furthermore, the human eye has a better sensitivity for the green color. The writing device can include flexible PET substrates, such that a user writing on the writing board feels like writing with a regular pen or a dry erase marker.

To realize the partial erase function, the liquid crystal writing apparatus 200, as shown in FIG. 2A, includes cholesteric liquid crystal (with or without polymer) layer 204 sandwiched by first 203 and second conductive layer 205. The LC layer 204 can be, e.g., 5-20 micron thick and the reflective color could be controlled by the concentration of the chiral dopant. Each of the first and second conductive layers 203 and 205 includes patterned electrodes. The conductive layers 203 and 205 can include ITO or polymer conductive layer, or other flexible materials, such as nano Ag wire or metal mesh.

The top substrate 201 is a transparent and flexible PET film. A user of the writing device can use a finger 207 (or pens, stylus, other objects) to write on the top substrate 201. The PET film can be coasted with anti-glare coating for less surface reflection and hard-coating for durability.

The layer 206 below the second conductive layer 205 can be a flexible PET transparent substrate. The bottom substrate 202 can be either coated with black ink, or include a non-transparent black PET film. Although the writing device illustrated in FIG. 2A includes black PET film, writing devices according to various embodiments can include films of any arbitrary colors.

Figure 2B:
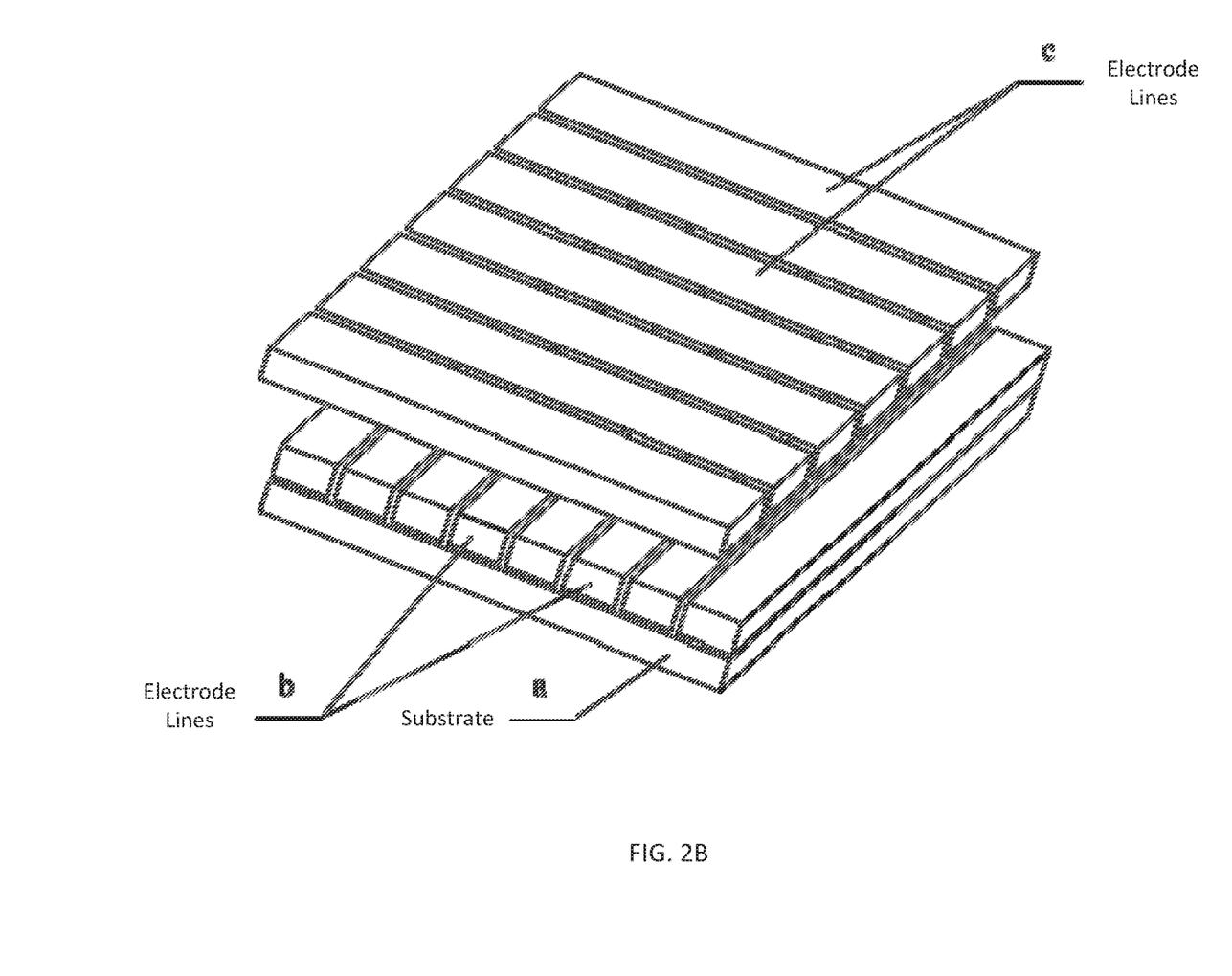
FIG. 2B is an illustration of the patterned electrodes of a liquid crystal writing device.

FIG. 2B is an illustration of the patterned electrodes of a liquid crystal writing device. In each of the first and second conductive layers 203 and 205, the patterned electrodes can have straight-line shapes and are parallel to each other. In other words, each of the two conductive layers has separated and parallel electrode lines. Each electrode line includes multiple electrodes. Then the electrode lines of the first conductive layers 203 are arranged to be orthogonally perpendicular to the electrode lines of the second conductive layer 205. Thus, the perpendicular electrode lines of the first and second conductive layers form a matrix of small pixels. The pixels can have square shapes.

The pixel size for the pixels can depend on the resolution requirement of the partial erase function. For example, a pixel size of a few square millimeters may be enough for teachers to correct the writing errors on the board. The pixels provide in-cell touch function for the purpose to provide the location information for the partial erase. For example, a passive matrix display integrated circuit (IC) controller can be connected to the electrodes within the LC writing layer in order to enable the selective erase function. In some alternative embodiments, the writing device itself does not need to include an in-cell touch component, but rely on an external touch device to determine the location of targeted erase area information.

A user can use fingers (or other devices such as pen or stylus) to write directly on the liquid crystal board device and to erase contents selectively. The writing device can collect the interactive touch information using various types of technologies. For example, the writing device can use electromagnetic resonance (EMR) technology. A metal pen is used to generate magnetic field when electric current passing through. When the mental pen moves on the writing board of the device, a location of the pen tip can be detected based on electromagnetic conversion principle, and is recorded as precise coordinate records. However, one drawback of the EMR touch technology is the high cost of materials and required special electronic pen, making it inconvenient to use.

The writing device 200 can include an in-cell type touch. The capacitive touch component includes etched electrode from internal conductive layer of the LC cell. In other words, the touch function is integrated into the liquid crystal sandwiched cell. Such a design has a few advantages, such as thin form factor, low cost and good use experience. The electrode can be made, e.g., from a traditional patterned indium tin oxide (ITO) or other conductive materials, etched into lines using a wet etch or laser etching. The neighboring electrode lines usually are fully separated so that there is no electrical contact between the neighboring electrode lines. The separated electrode lines help making sharp boundaries among erase target areas. However, etching can be expensive and usually cannot be made into roll-to-roll manufacturing. Furthermore, bonding each of single electrode is time-consuming and lots of failure can happen because the ITO lines are easy to be broken when the ITO film is coated on the flexible PET substrate.

Figure 3:
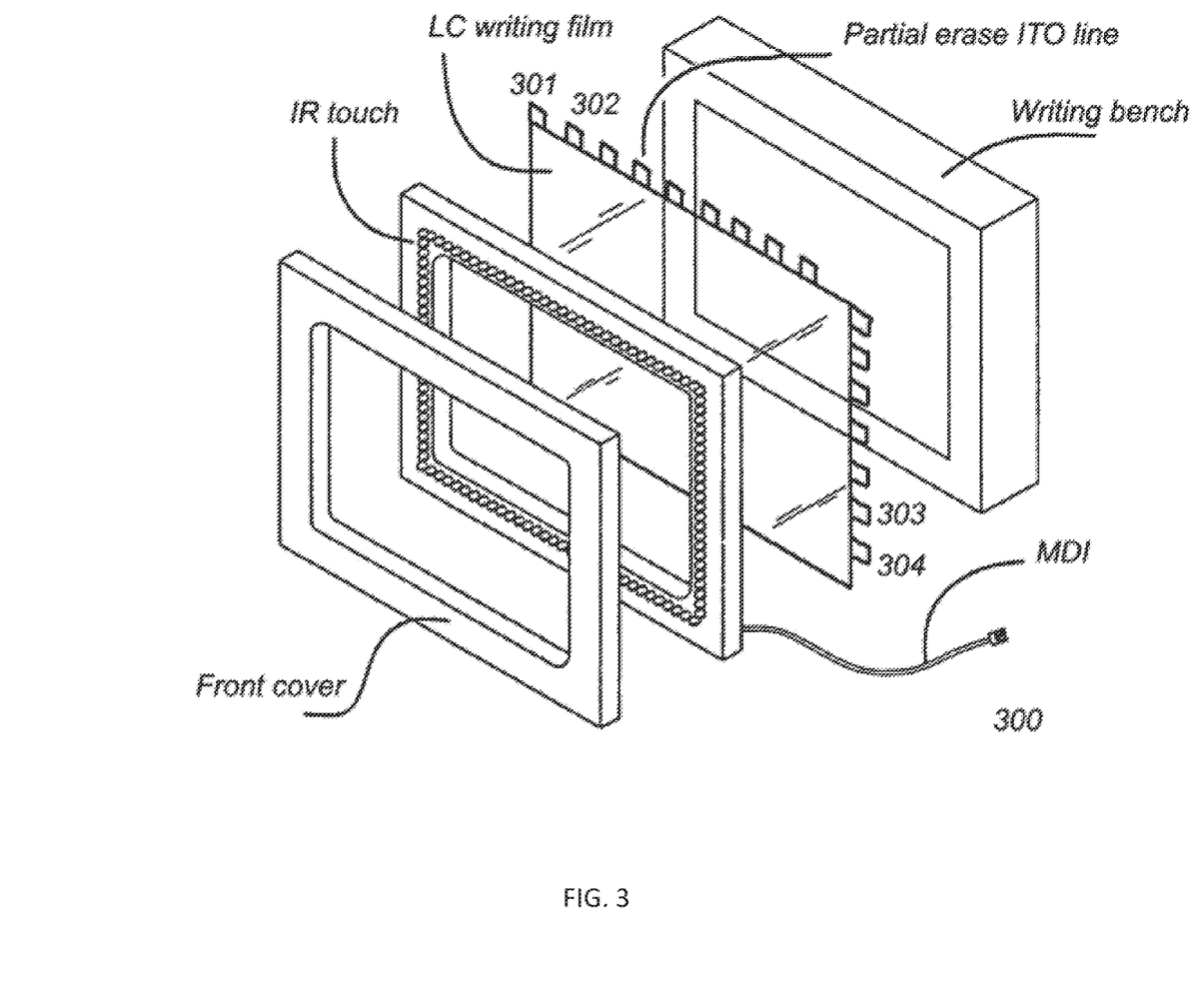
FIG. 3 is an illustration of an LC writing device including infrared (IR) touch components.

In some embodiments, partially separated small electrodes can be utilized to create partial erase. There are several approaches to create partial-separation ITO lines. FIG. 3 is an illustration of an LC writing device including infrared (IR) touch components. As shown in FIG. 3, electrodes 301 and 302 (and electrodes 303 and 304) do not need to be 100% separated. The electrodes can actually have some contact and can provide more control capability. For example, ITO line-width with partial separation can be less than 10 microns. This makes bonding FPC connectors with a lot of flexibility. This partial separation of ITO line usually is operated by controlling the voltage and frequencies, which has a few advantages: 1) Roll-to-roll production with a low cost is possible; 2) partial erase area size is programmable.

Power supply of the writing device (e.g. battery) continuously provides a small touch current running through the electrodes to scan the capacitance level of the electrode matrix. In some embodiments, the voltage level of the small touch current can be, e.g., 3-5 volts. Once an erase signal is received (e.g., a user pressing a button or switch triggering the erase function), the writing device detects the erase touch pressure to a portion of the writing layer based on the change of the capacitance level of the electrodes corresponding to that portion. The electronic system of the writing device obtains the location information based on the electrodes with changed capacitance levels.

Accordingly, a display chip of the writing device applies proper voltage to the targeted electrodes to erase the writing on the portion of the writing layer. In other words, in the electrode passive-matrix, the display chip controls the electrodes relating with the specific area and implements the partial erase function to erase writing on certain areas. A similar algorism is applicable to save the writing traces digitally.

This device can be built for electronically capturing an image on a writing board, storing the image in a memory card and then downloading the captured image back onto mobile devices. FC-state or P-state can be detected by measuring the capacitance of electrodes of the targeted pixels. The optical state of FC-state or P-state is determined by the orientation arrangement of molecules of liquid crystals. On the other hand, the capacitance measured at applied low voltage of FC-state or P-state is also determined by the arrangement of molecules of liquid crystals. Therefore, measuring the capacitance of liquid crystals before and after writing can be the method to erase or save the writing image by checking the optical state of F-state or P-state at certain area.

In some embodiments, the capacitance of the electrodes sandwiching a LC cell at P-state can be about 3 nF at 3V. The capacitance of the electrodes sandwiching a LC cell at FC-state can be about 5 nF at 3V. The capacitance levels are different for the P-state and FC-state, because of the different liquid crystal molecule orientation for P-state and FC-state. The different liquid crystal molecule orientation cause different dielectric constants for those two states.

Based on the different capacitance levels of the electrode pairs, the writing device can identify the LC cells at P-state and the LC cells at FC-state. The writing device can assume that the LC cells at P-state present the foreground color (i.e. image content) and the LC cells at FC-state present the background color. Thus, based on the locations of the LC cells at P-state and FC-state, the writing device can capture the image based on the capacitance levels.

In some embodiments, as shown in FIG. 3, the writing device includes an external infra-red (IR) touch unit which includes a matching combination of infrared transmitter and infrared receiving unit connected and fixed to liquid crystal writing board. The infrared transmitter includes multiple splicing of electrical infrared emission units, and the linear array of infrared emission heads. The IR touch design can be standardized in production, increasing efficiency and reducing costs.

Figure 4:
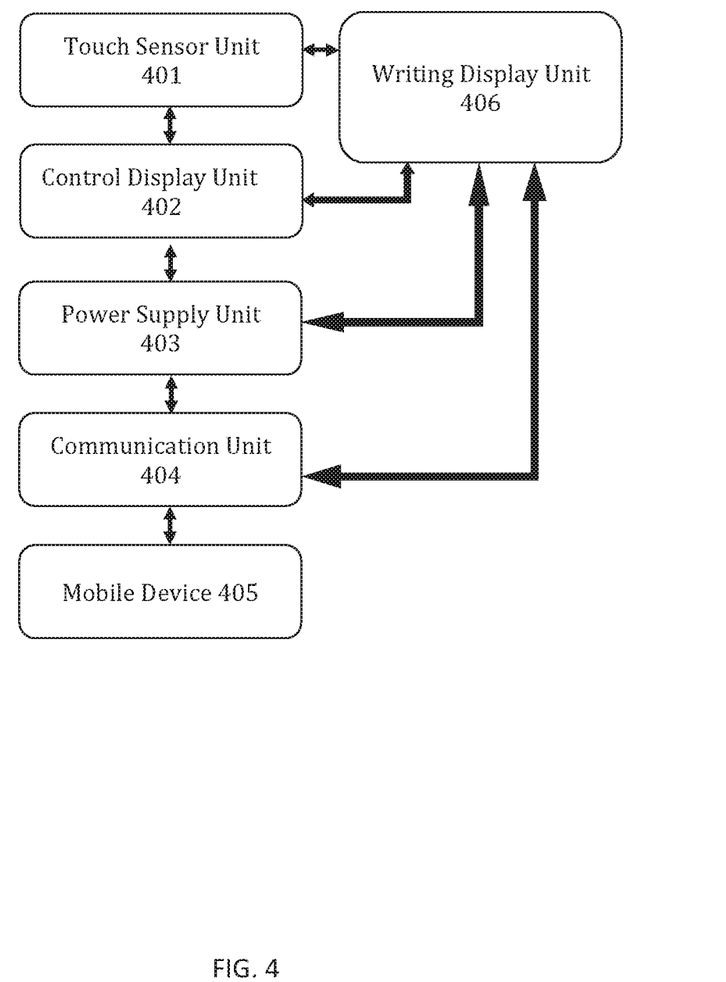
FIG. 4 is an illustration of an LC writing device with a display function.

FIG. 4 is an illustration of an LC writing device with a display function. First step is to read the drawings from the memory or external device. A user can control the communication unit 404 and connect via Bluetooth or WiFi to a mobile device 405 (e.g., a phone or tablet) or integrated external display device. The user can select and display information (e.g., previously written electronic notes) from the memory or external mobile device on the writing board 400. The writing board acts as an external display of the mobile device 405. In some other embodiments, the mobile device can also act as an external display of the writing unit 406.

During the operation of the display function, there may not be an external mechanical pressure applied on the surface of the writing device to mechanically switch the liquid crystal cells from FC-state to P-state. Instead, the writing device will apply a display voltage pulse to some of the liquid crystal cells for electronically switching from FC-state to P-state. In some embodiments, the display voltage pulse has a voltage level of 25-50 volts. After the pulse of 25-50 volts, the voltage level applied to the electrodes immediately drops to zero volts.

In some embodiments, the writing device can use a direct addressing method for driving the display. According to the direct addressing method, electrode segment is directly connected and controlled individually by the peripheral electronics. The segments are arranged in a way such that the electrodes can produce the desired display image (or writing). The most common arrangement is the 7-segments arrangement, which is commonly used in alphanumerical displays, such as calculators and watches. In this method, no multiplexing is available and this is the reason for only being used in low information content applications. In the direct method, the smallest controllable component for the image production is called segment instead of pixel.

As the size of displays and the size of the information content increases, there is a need for more image elements. The solution to this problem was the modification of the segments arrangement into a pixels matrix with M rows and N columns. In this method, each pixel cannot be controlled individually and a multiplexing addressing approach is to be realized. The new multiplexed addressing method was the passive matrix (PM).

The passive matrix is a one-line-at-a-time driving method. During the programming time, a pulse from the row peripheral driver activates all the pixels of the programming line and at the same time, the data voltage is delivered to the storage capacitor and the liquid crystal through the peripheral column driver. Passive matrix is the addressing method with the minimum number of interconnections. For example, for an M rows and N columns array, the direct method needs M×N interconnections while the passive matrix method needs M+N interconnections. Furthermore, passive matrix is a simple and the cost-efficient method.

Figure 5A:
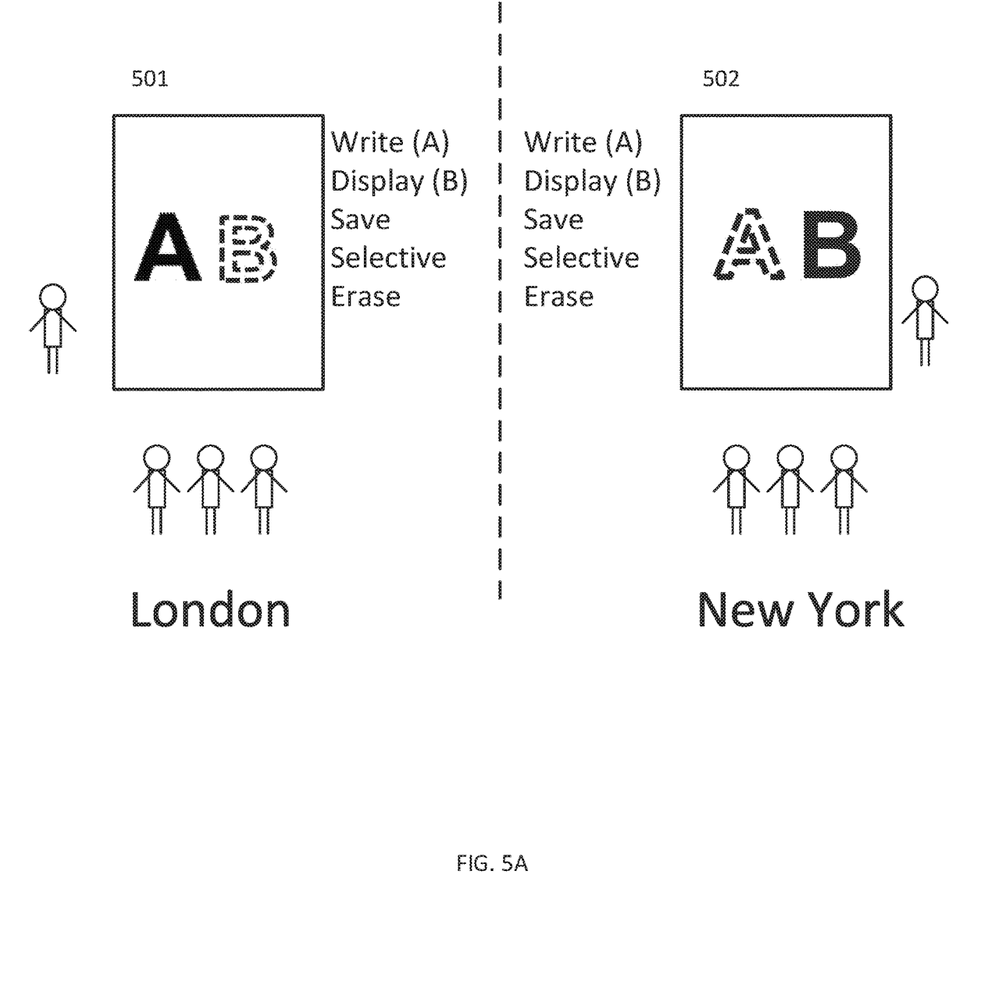
FIG. 5A is an illustration of setting up and exchanging information for a conference call using the writing devices.

In some embodiments, the disclosed writing device can be utilized in a conference meeting system. The conference meeting system establishes a connection to each participant of a teleconference. FIG. 5A is an illustration of setting up and exchanging information for a conference call using the writing devices.

A meeting room in London has a conference meeting system including a LC writing board 501. A meeting room in New York has a conference meeting system including a LC writing board 502. Both 501 and 502 has function of save, selective erase and display writings. The presenter in London can write information "A" on the board 501. In real time or in near real time, the board 502 receives and displays the information "A" accordingly. Similarly, another presenter in New York can write information "B" on the board 502. In real time or in near real time, the board 501 receives and displays the information "B" accordingly.

Furthermore, in some embodiments, the LC writing device 510 that is in a conference meeting in London can remotely control the second LC writing device 502 in New York. The method sends images captured by a touch screen remotely. The method receives images captured by a touch screen of the second device. The method sends a command through a communication channel of a real-time communication session between writing boards and to perform an operation that modifies the writing images remotely in different location.

Figure 5B:
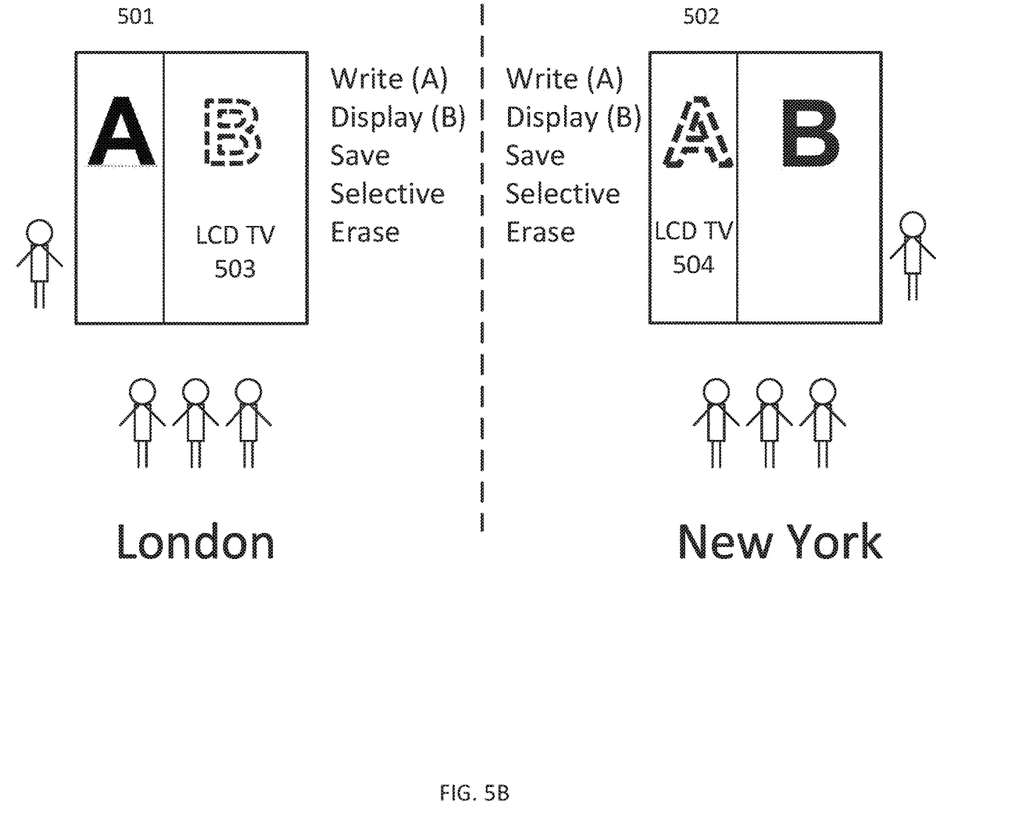
FIG. 5B is an illustration of a conference system including writing devices and TV displays.

FIG. 5B is an illustration of a conference system including writing devices and TV displays. The liquid crystal writing device 501 and 502 can provide the save and selective erase functions, while the TV displays 503 and 504 can provide the display functions. The liquid crystal writing device 501 and 502 and the TV display 503 and 504 can communicate remotely through a communication channel so that the write and display functions can be controlled remotely.

Figure 6:
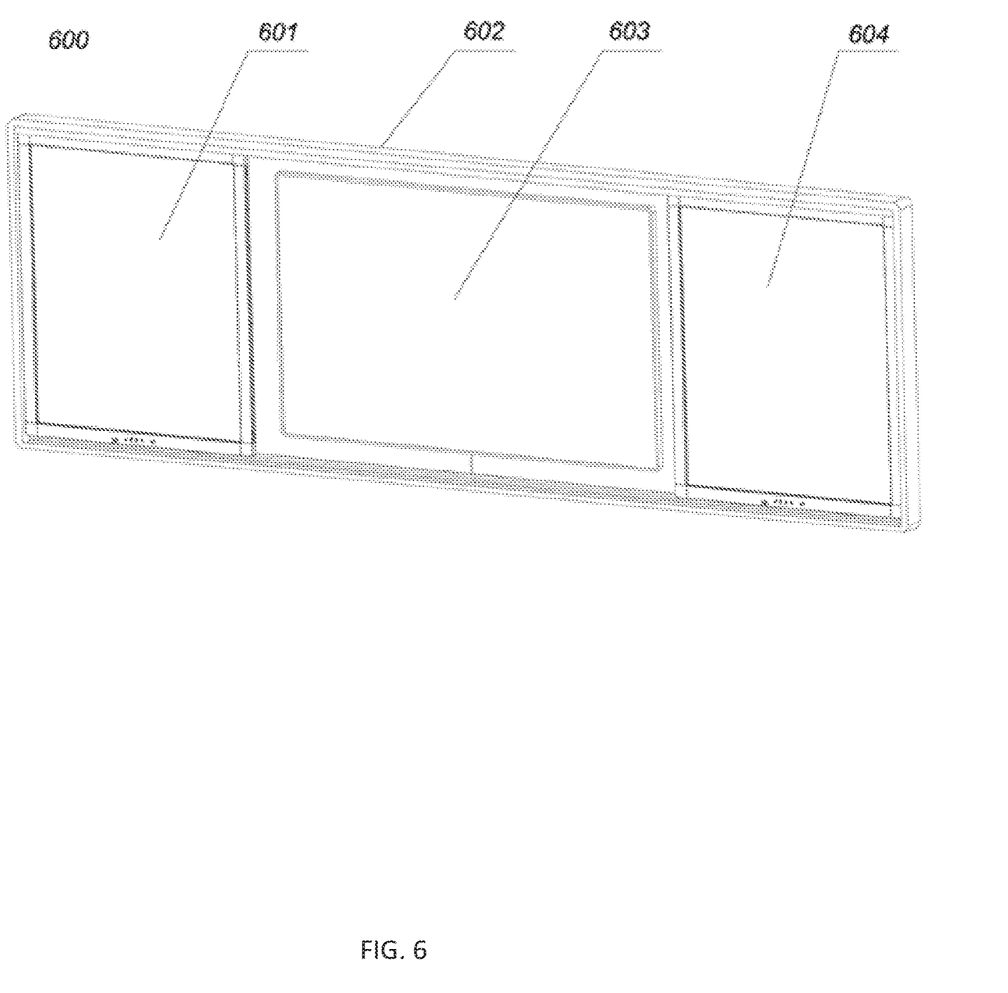
FIG. 6 is an illustration of an electronic blackboard system including large LC writing boards.

FIG. 6 is an illustration of an electronic blackboard system including large LC writing boards. The system 600 can be a standardized blackboard system that can be used in various applications, e.g., conference or classroom. The system 600 includes two large LC writing blackboard 601 and 604 can slide freely from left to right, or vice versa. In some other embodiments, the system can include more LC writing boards behind boards 601 and 604 in order to provide an even larger writing area. The system 600 includes a smart LCD TV 603, which includes built-in computer and is placed in the middle of the system 600 (or anywhere behind the LC writing board). The system 600 further includes the frame 602 that can be made of metal material, such as steel, in order to provide reliable support for the whole blackboard system.

Users of the system 600 can write mainly on LC writing boards 601 and 604. The LC writing boards 601 and 604 can have built-in save functions. Any writing on boards 601 and 604 can be saved into internal memory card through the built-in PCB board for 600. The LC writing boards 601 and 604 can also have built-in partial erase functions. The display function can be provided by the smart LCD TV 603.

Figure 7:
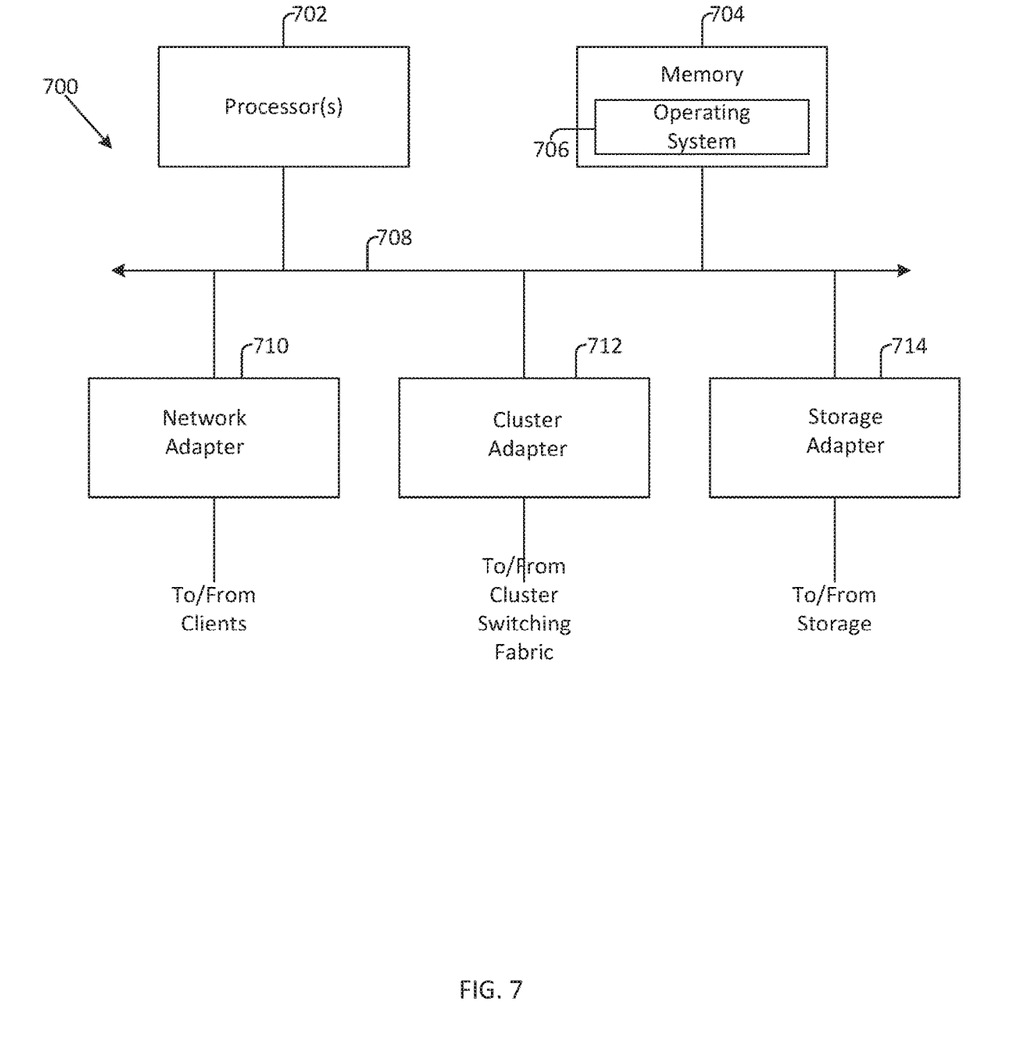
FIG. 7 is a high-level block diagram illustrating an example of a hardware architecture of a computing device that performs disclosed processes, in various embodiments.

FIG. 7 is a high-level block diagram illustrating an example of a hardware architecture of a computing device 700 that performs the above process, in various embodiments. The computing device 700 executes some or all of the processor executable process steps that are described below in detail. In various embodiments, the computing device 700 includes a processor subsystem that includes one or more processors 702. Processor 702 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 700 can further include a memory 704, a network adapter 710, a cluster access adapter 712 and a storage adapter 714, all interconnected by an interconnect 708. Interconnect 708 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The cluster access adapter 712 includes one or more ports adapted to couple the computing device 700 to other devices. In the illustrated embodiment, Ethernet can be used as the clustering protocol and interconnect media, although other types of protocols and interconnects may be utilized within the cluster architecture described herein.

The computing device 700 can be embodied as a single- or multi-processor system executing an operating system 706 that can implement a high-level module, e.g., a manager, to logically organize the information as a hierarchical structure of named directories, files and special types of files called virtual disks at the storage devices. The computing device 700 can further include graphical processing unit(s) for graphical processing tasks or processing non-graphical tasks in parallel.

The memory 704 can comprise storage locations that are addressable by the processor(s) 702 and adapters 710, 712, and 714 for storing processor executable code and data structures. The processor 702 and adapters 710, 712, and 714 may, in turn, comprise processing elements and/or logic circuitry configured to execute the software code and manipulate the data structures. The operating system 706, portions of which are typically resident in memory and executed by the processor(s) 702, functionally organizes the computing device 700 by (among other things) configuring the processor(s) 702 to invoke. It will be apparent to those skilled in the art that other processing and memory implementations, including various computer readable storage media, may be used for storing and executing program instructions pertaining to the technology.

The network adapter 710 can include multiple ports to couple the computing device 700 to one or more clients over point-to-point links, wide area networks, virtual private networks implemented over a public network (e.g., the Internet) or a shared local area network. The network adapter 710 thus can include the mechanical, electrical and signaling circuitry needed to connect the computing device 700 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 714 can cooperate with the operating system 706 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 714 can include multiple ports having input/output (I/O) interface circuitry that couples to the disks over an I/O interconnect arrangement, e.g., a conventional high-performance, Fibre Channel (FC) link topology. In various embodiments, the cluster adapter 712 and the storage adapter 714 can be implemented as one adapter configured to connect to a switching fabric, e.g., a storage network switch, in order to communicate with other devices and the mass storage devices.

Examples of Certain Embodiments

Certain embodiments of the technology introduced herein are summarized in the following numbered examples:

1. An electronic writing device, comprising: a transparent top layer; a liquid crystal layer including a plurality of liquid crystal cells beneath the transparent top layer, the liquid crystal layer configured to display an image by switching one or more of the liquid crystal cells from a scattering state to a reflective state; a matrix of electrodes configured to supply voltage signals to the liquid crystal cells; and a control circuitry configured to receive an erase command, the erase command indicating that a touched area of the transparent top layer is touched and instructing to erase at least a portion of the image from the touched area; wherein the control circuitry is further configured to instruct one or more electrodes from the matrix to apply an erase voltage signal to a portion of the liquid crystal cells that correspond to the touched area, wherein the erase voltage signal switches the portion of the liquid crystal cells to the scattering state.

2. The electronic writing device of example 1, wherein the liquid crystal cells of the scattering state present background of the image, and the liquid crystal cells of the reflective state present content of the image, and wherein the electronic writing device erases the portion of the image using the erase voltage signals that switches the corresponding portion of the liquid crystal cells to the scattering state.

3. The electronic writing device of example 1, wherein the matrix of electrodes comprises: a first conductive layer on top of the liquid crystal layer, the first conductive layer including a plurality of first electrode lines extending in parallel along a first direction; and a second conductive layer on top of the liquid crystal layer, the second conductive layer including a plurality of second electrode lines extending in parallel along a second direction, the second direction being perpendicular to the first direction; wherein the perpendicular first and second electrode lines form the matrix of electrodes.

4. The electronic writing device of example 3, wherein the matrix of electrodes detects the mechanical pressure applied on the touched area by detecting a change of capacitance levels between the first and second conductive layer for electrodes that correspond to the touched area.

5. The electronic writing device of example 4, wherein the control circuitry determines a location of the touched area by identifying the electrodes having the change of capacitance levels.

6. The electronic writing device of example 1, wherein in response to that the mechanical pressure is continuously applied to different touched areas, the control circuitry continuously instructs electrodes from the matrix to apply erase voltage signals to liquid crystal cells that correspond to the touched areas.

7. The electronic writing device of example 3, wherein the first electrode lines of the first conductive layer are either fully separated from each other or partially separated, and the second electrode lines of the second conductive layer are either fully separated from each other or partially separated.

8. The electronic writing device of example 3, wherein during operation of the electronic writing device, the first and second conductive layers monitor capacitance levels of the liquid crystal cells based on fluctuation of currents running through the first and second electrode lines; and wherein the control circuitry is configured to locate the touched area for image erasure by identifying electrodes with changing capacitance levels.

9. The electronic writing device of example 1, wherein the control circuitry is configured to receive a write command, a partial erase command, or a full erase command; wherein in response to the write command, a mechanical pressure applied on a pressed area causes the liquid crystal cells of the pressed area switching from a scattering state to a reflective state due to mechanical stress on liquid crystal molecules within the liquid crystal cells; in response to the partial erase command, the erase voltage signal applied to the liquid crystal cells corresponding to the touched area causes the liquid crystal cells of the touched area switching from a scattering state to a reflective state; and in response to the full erase command, the control circuitry instructs all electrodes from the matrix to apply an erase voltage signal to all of the liquid crystal cells, wherein the erase voltage signal switches the liquid crystal cells to the scattering state.

10. The electronic writing device of example 9, further comprising: one or more buttons or switches for generating the write command, the partial erase command, or the full erase command.

11. The electronic writing device of example 1, further comprising: a data storage for storing data of the image displayed by the liquid crystal layer; and a record circuitry configured to: detect cell state information regarding whether each of the liquid crystal cells is in the scattering state or the reflective state, convert the cell state information into the data of the image based on whether each cell is in the scattering state or the reflective state, and store the data of the image into the data storage.

12. The electronic writing device of example 11, wherein the record circuitry detects whether a particular liquid crystal cell is in the scattering state or the reflective state by measuring a capacitance level between a pair of electrodes placed on top of and beneath the particular liquid crystal cell.

13. The electronic writing device of example 1, further comprising: a data interface for retrieving data of a display image; and wherein the control circuitry is configured to instruct one or more electrodes from the matrix to apply a display voltage signal to a portion of the liquid crystal cells, wherein the display voltage signal switches the portion of the liquid crystal cells to the reflective state for displaying the display image.

14. A method for selectively erasing images from a liquid crystal writing device, comprising: receiving a command for partially erasing an image being displayed on the liquid crystal writing device, the liquid crystal writing device including a plurality the liquid crystal cells for displaying images; detecting that a touched area of the liquid crystal writing device is touched by an external object; identifying a portion of the liquid crystal cells that correspond to a location of the touched area; and applying an erase voltage pulse to the portion of the liquid crystal cells to switch states of the cells such that a portion of the image displayed on the touched area is erased.

15. The method of example 14, wherein the location of the touched area is identified by monitoring capacitance levels of electrode pairs for each liquid crystal cell, and the erase voltage pulse is applied to the liquid crystal cells via the electrode pairs for the touched area.

16. The method of example 14, wherein the location of the touched area is identified by a touch panel of the liquid crystal writing device using infrared touch sensing, resistive touch sensing, capacitive touch sensing, or electo-magnetic resonance touch sensing.

17. The method of example 14, further comprising: receiving a command for recording the image being displayed on the liquid crystal writing device; identifying liquid crystal cells that are in a reflected state and are presenting content of the image, by sensing capacitance levels of electrode pairs for each liquid crystal cell; generating data of the image based on the locations of the identified liquid crystal cells on a display surface of the liquid crystal writing device; and storing the data of the image in a storage component of the liquid crystal writing device or transmitting the data of the image via a communication interface of the liquid crystal writing device.

18. The method of example 14, further comprising: receiving a command for displaying an image; retrieving data of the image; identifying liquid crystal cells that have locations corresponding to the foreground content of the image; applying a display voltage pulse to the identified liquid crystal cells through electrode pairs for the identified liquid crystal cells to switch states of the cells to a reflected state such that the image is displayed on the liquid crystal writing device.

19. A liquid crystal writing apparatus for selectively erasing displayed content, comprising: means for displaying an image using liquid crystal cells of the liquid crystal writing apparatus; means for receiving a mechanical pressure applied to the liquid crystal writing apparatus; means for detecting a location of a pressed area due to the mechanical pressure; and means for selectively applying an erase voltage pulse to liquid crystal cells corresponding to the pressed area for partially erasing the image from the pressed area of a display of the liquid crystal writing apparatus.

20. The liquid crystal writing apparatus of example 19, further comprising: means for establishing a communication channel with a second liquid crystal writing apparatus for a remote conference; means for synchronizing images being displaying on the liquid crystal writing apparatus and the second liquid crystal writing apparatus, when new content is written on either the liquid crystal writing apparatus or the second liquid crystal writing apparatus, or when content is partially erased from either the liquid crystal writing apparatus or the second liquid crystal writing apparatus.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

I claim:

1. An electronic writing device, comprising:
   a transparent top layer;
   a liquid crystal layer including a plurality of liquid crystal cells beneath the transparent top layer, the liquid crystal layer configured to display an image by switching one or more of the liquid crystal cells from a scattering state to a reflective state in response to a pressing force;
   a matrix of electrodes controllable to supply voltage signals to the liquid crystal cells; and
   a control circuitry configured to receive an erase command, the erase command allowing one or more electrodes of the matrix of electrodes corresponding to a touch area to be identified, the touch area being identified using infrared touch sensing;
   wherein the control circuitry is further configured to erase at least a portion of the image from the touched area, by causing the one or more electrodes from the matrix of electrodes to apply an erase voltage signal to a portion of the liquid crystal cells corresponding to the touched area, wherein the erase voltage signal switches the portion of the liquid crystal cells to the scattering state.

2. The electronic writing device of claim 1, wherein:
   the liquid crystal cells in the scattering state are configured to display background of the image; and
   the liquid crystal cells in the reflective state are configured to display content of the image.

3. The electronic writing device of claim 1, wherein the matrix of electrodes comprises:
   a first conductive layer on top of the liquid crystal layer, the first conductive layer including a plurality of first electrode lines extending in parallel along a first direction; and
   a second conductive layer below the liquid crystal layer, the second conductive layer including a plurality of second electrode lines extending in parallel along a second direction, the second direction being perpendicular to the first direction; and
   wherein the perpendicular first and second electrode lines form the matrix of electrodes.

4. The electronic writing device of claim 3, wherein the plurality of first electrode lines of the first conductive layer are either fully separated from each other or partially separated from each other;
   wherein the plurality of second electrode lines of the second conductive layer are either fully separated from each other or partially separated from each other; and
   wherein a pair of electrode lines that are fully separated from each other have no electrical contact between the pair of electrode lines.

5. The electronic writing device of claim 1, wherein the control circuitry is configured to, in response to detecting a touch action at different touched areas, control one or more electrodes of the matrix of electrodes to apply the erase voltage signal to the liquid crystal cells that correspond to the different touched areas.

6. The electronic writing device of claim 1, further comprising:
   a data storage; and
   a record circuitry configured to:
      detect cell state information regarding whether each of the liquid crystal cells is in the scattering state or the reflective state;
      convert the cell state information into data of the image; and
      store the data of the image into the data storage.

7. The electronic writing device of claim 6, wherein the record circuitry is configured to detect whether a particular liquid crystal cell is in the scattering state or the reflective state based on measuring a capacitance level between a pair of electrodes placed on top of and beneath the particular liquid crystal cell.

8. The electronic writing device of claim 1,
   wherein the image is a first image;
   wherein the electronic writing device further comprises a data interface configured to retrieve data of a second image; and
   wherein the control circuitry is configured to control one or more electrodes of the matrix of electrodes to apply a display voltage signal to a portion of the plurality of liquid crystal cells to set the portion of the plurality of liquid crystal cells to the reflective state to display the second image.

9. The electronic writing device of claim 1, further comprising a non-transparent bottom layer;
   wherein the liquid crystal cells are sandwiched between the transparent top layer and the non-transparent bottom layer;
   wherein the matrix of electrodes comprise conductive lines etched onto a first surface of the transparent top layer and a second surface of the non-transparent bottom layer; and wherein the conductive lines comprises at least one of: indium tin oxide (ITO), or a polymer conductor.

10. The electronic writing device of claim 1, wherein the control circuitry is configured to receive a write command, the erase command as a partial erase command, or a full erase command; wherein:
   in response to the write command, the pressing force applied on a pressed area causes the one or more liquid crystal cells of the pressed area to switch from the scattering state to the reflective state;
   in response to the partial erase command, the erase voltage signal applied to the portion of the liquid crystal cells corresponding to the touched area causes the portion of liquid crystal cells corresponding to the touched area to switch from the reflective state to the scattering state; and
   in response to the full erase command, the control circuitry causes all electrodes from the matrix of electrodes to apply an erase voltage signal to all of the plurality of liquid crystal cells, wherein the erase voltage signal switches all of the plurality of liquid crystal cells to the scattering state.

11. The electronic writing device of claim 10, further comprising:
   one or more buttons or switches for generating at least one of: the write command, the partial erase command, or the full erase command.

12. A liquid crystal writing apparatus comprising a transparent top layer, a plurality of liquid crystal cells beneath the transparent top layer, and a matrix of electrodes, the liquid crystal writing apparatus further comprising:
   means for receiving an erase command for partially erasing an image being displayed on the liquid crystal writing device, the image being displayed by switching one or more of the liquid crystal cells from a scattering state to a reflective state in response to a pressing force;
   means for identifying one or more electrodes of the matrix of electrodes corresponding to a touch area, the touch area being identified using infrared touch sensing; and
   means for causing the one or more electrodes from the matrix of electrodes to apply an erase voltage signal to a portion of the liquid crystal cells corresponding to the touch area, wherein the erase voltage signal switches the portion of the liquid crystal cells to the scattering state.

13. The liquid crystal writing apparatus of claim 12, further comprising:
   means for establishing a communication channel with a second liquid crystal writing apparatus for a remote conference;
   means for synchronizing images being displaying on the liquid crystal writing apparatus and the second liquid crystal writing apparatus, when new content is written on either the liquid crystal writing apparatus or the second liquid crystal writing apparatus, or when content is partially erased from either the liquid crystal writing apparatus or the second liquid crystal writing apparatus.

14. A method for erasing from a liquid crystal writing device, the liquid crystal writing device including a transparent top layer, a plurality of liquid crystal cells beneath the transparent top layer, and a matrix of electrodes, the method comprising:
   receiving an erase command for partially erasing an image being displayed on the liquid crystal writing device, the image being displayed by switching one or more of the liquid crystal cells from a scattering state to a reflective state in response to a pressing force;
   identifying one or more electrodes of the matrix of electrodes corresponding to a touch area, the touch area being identified using infrared touch sensing; and
   causing the one or more electrodes from the matrix of electrodes to apply an erase voltage signal to a portion of the liquid crystal cells corresponding to the touch area, wherein the erase voltage signal switches the portion of the liquid crystal cells to the scattering state.

15. The method of claim 14, further comprising:
   receiving a command to record the image being displayed on the liquid crystal writing device;
   identifying liquid crystal cells that are in a reflected state and are presenting content of the image, the identifying being based on sensing capacitance levels of electrode pairs for each liquid crystal cell;
   generating data of the image based on locations of the identified liquid crystal cells on a display surface of the liquid crystal writing device; and
   performing at least one of: storing the data of the image in a storage component of the liquid crystal writing device or transmitting the data of the image via a communication interface of the liquid crystal writing device.

* * * * *